Aug. 15, 1961 F. M. WILLIAMSON Re. 25,027

CIRCULATING SYSTEMS FOR HYDRAULIC LIQUID BETWEEN TANKS AND CYLINDERS

Original Filed Dec. 18, 1957 3 Sheets-Sheet 1

INVENTOR.
Floyd M. Williamson
BY
Grant S. Baldwin
Attorney

Aug. 15, 1961 F. M. WILLIAMSON Re. 25,027

CIRCULATING SYSTEMS FOR HYDRAULIC LIQUID BETWEEN TANKS AND CYLINDERS

Original Filed Dec. 18, 1957 3 Sheets-Sheet 2

INVENTOR.
Floyd M. Williamson
BY
Grace S. Baldwin
Attorney

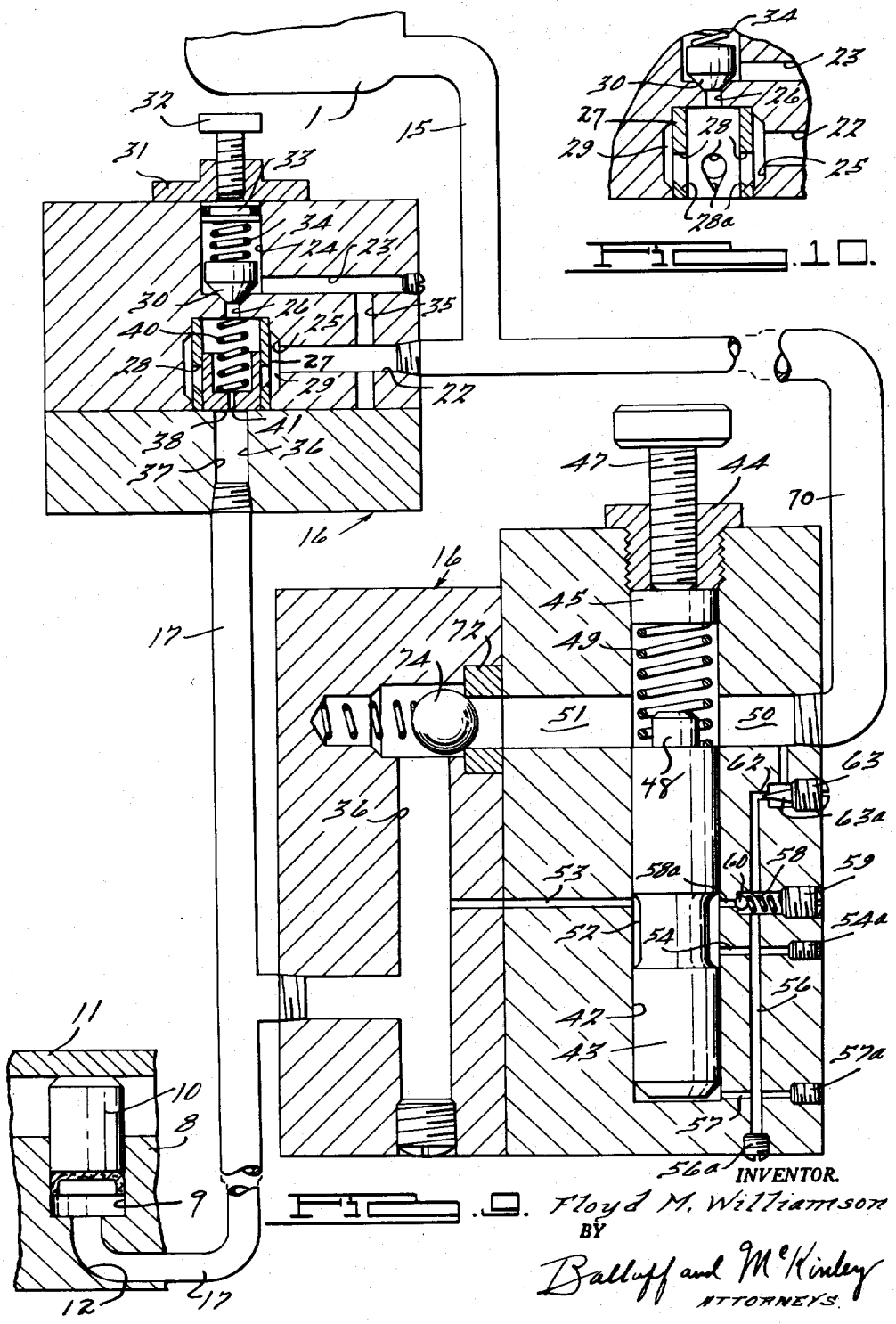
32
31
33
1
15
34
24
23
30
26
35
40
25
28
27
29
22
41
38
36
37
16
17
11
10
8
9
12
17
34
23
30
26
27
28
22
29
25
28a
47
44
70
16
45
49
72
74
51
50
48
62
63
63a
36
53
58a
60
58
59
54a
52
54
56
42
43
57a
57
56a
INVENTOR.
Floyd M. Williamson
BY
Ballaff and McKinley
ATTORNEYS.

United States Patent Office

Re. 25,027

Reissued Aug. 15, 1961

25,027

CIRCULATING SYSTEMS FOR HYDRAULIC LIQUID BETWEEN TANKS AND CYLINDERS

Floyd M. Williamson, Detroit, Mich.

Original No. 2,901,238, dated Aug. 25, 1959, Ser. No. 703,667, Dec. 18, 1957. Application for reissue Dec. 20, 1960, Ser. No. 77,259

16 Claims. (Cl. 267—1)

Matter enclosed in heavy brackets [ ] appears in the original patent but forms no part of this reissue specification; matter printed in italics indicates the additions made by reissue.

This invention relates to improvements in circulating systems for hydraulic liquid between tanks and cylinders, and refers particularly to such a system for delaying the movement of pads in dies in mechanical presses. In such a system relatively low pressure, say one hundred pounds per square inch, which is constantly maintained upon liquid in a tank, is exerted in the cylinder during the opening of the press for moving the pad to its extended position, and during the closing of the press high pressure, say several thousand pounds per square inch, is exerted through the pad upon the liquid in the cylinder to open a relief valve. While performing some press operations, however, it is very desirable to retain the pad in its retracted position until after the dies have opened sufficiently to free the workpiece and thereby prevent distortion of the latter which might occur if outward movement of the pad commenced simultaneously with the opening of the [press] *dies*. Moreover the arrangement herein shown contemplates the use of the invention on a [large] press the speed of which is relatively slow so that the temperature of the hydraulic liquid does not become unduly high. However if the invention is to be employed on a [small,] fast moving press a means for circulating the liquid through the tank to reduce its temperature, such as that shown in my co-pending application Serial No. 643,635 filed March 4, 1957, now Patent No. 2,842,357 may also be included in the system.

It is then an object of the invention to provide such a circulating system for hydraulic liquid between tanks and cylinders wherein means are provided for delaying the commencement of outward movement of pads in dies for an appreciable interval of time after the dies themselves commence to open.

Another object of the invention is to provide such a circulating system for hydraulic liquid including means for adjusting the time interval between the commencement of opening of the press and commencement of outward movement of the pads.

A further object of the invention is to provide such a circulating system for hydraulic liquid wherein means are provided for cushioning the shock [caused upon reversal of flow of] *due to the impact on the* hydraulic liquid [between a cylinder and a tank.] *when the dies close.*

Yet another object of the invention is to provide such a circulating system for hydraulic liquid wherein means are provided for facilitating the separation of entrained air from hydraulic liquid so that the air may pass freely back to the tank.

With these and other objects and advantages in view which will become apparent as the specification proceeds, the invention is hereinafter more fully described with the aid of the accompanying drawings, in which:

*FIGURE 9 is a diagrammatic and simplified illustration of the system; and*

*FIGURE 10 is an enlarged fragmentary sectional view of part of the relief valve and assembly.*

Figure 1:
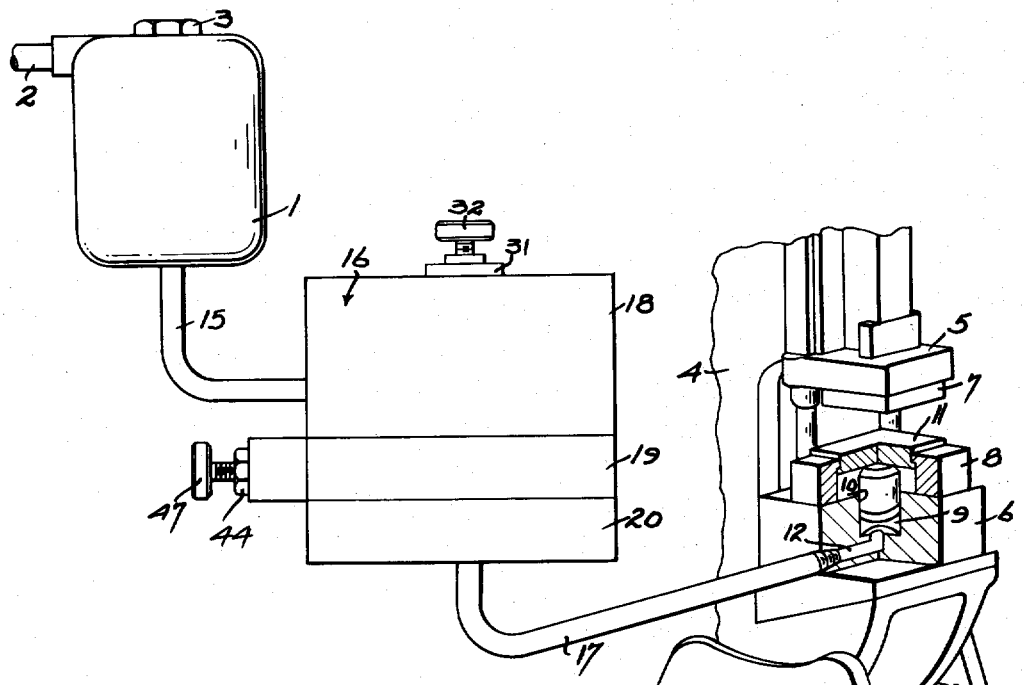
FIGURE 1 is a diagrammatic view showing the arrangement of the invention.
Figure 2:
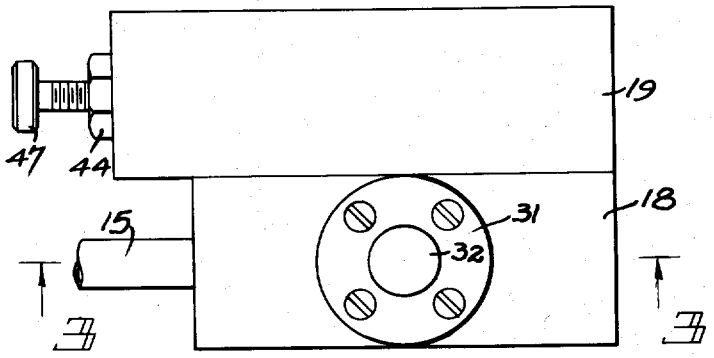
FIGURE 2 is an enlarged plan view of the control valve.

Referring to the drawings, 1 designates a tank having a pipe 2 connected thereto which extends from a source of compressed air or other fluid under pressure—not shown; and 3 denotes a conventional closure secured to the tank upon removal of which hydraulic liquid may be poured thereinto.

A portion of a mechanical press is diagrammatically shown at 4, and includes upper and lower die shoes 5 and 6 on which upper and lower dies 7 and 8, respectively, are secured. Provided in the lower die shoe 6 is a cylinder 9 having a plunger 10 therein, and mounted for vertical movement in the lower die 8 is a pad 11 adapted to be upwardly moved by the plunger 10. Formed through the lower shoe is a passage 12 which terminates at its inner extremity in the cylinder 9. Extending from the underside of the tank 1 is a conventional connection 15 the opposite extremity of which is secured to a passage 22 formed in a control valve 16, and from the latter another connection 17 extends to [the opposite extremity of which is secured to] the outer end of the passage 12.

Figure 3:
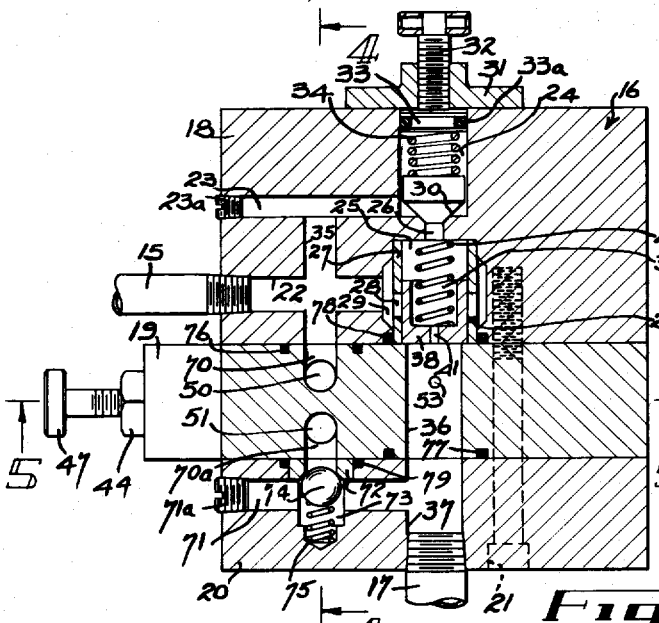
FIGURE 3 is a section on the line 3—3 of FIGURE 2.

The control valve 16 includes a plurality of horizontal blocks 18, 19 and 20 which are secured to one another as by screws 21, only one of which is shown in FIGURE 3. The passage 22 is formed in the upper block 18, and formed also in the latter parallel with and above the passage 22 is an opening 23 the outer extremity of which is plugged as shown at 23a. Extending vertically into the block 18 from its upper extremity is a bore 24 in the lower extremity of which the inner end of the opening 23 terminates. Formed also in the underside of the block 18 in axial alignment with the bore 24 is an aperture 25 which is spaced beneath the said bore and is connected thereto by a passage 26 of relatively small cross section which is coaxial with the said bore and aperture. Mounted in the aperture 25 and extending throughout the height of the latter is a bushing 27, and formed through the bushing intermediately of its height are spaced radial openings 28 which connect the bore of the bushing with an annular chamber 29 formed in the block 18 around the outer periphery of the said bushing. Formed in the underside of each opening 28 is a substantially V-shaped notch [26a] *28a* which is outwardly and upwardly inclined.

The upper extremity of the passage 26 which is tapered is of upwardly increasing diameter to receive the lower extremity of a correspondingly tapered pilot valve 30 which is adapted to close the bore 24 from the passage 26. Suitably secured on the top of the block 18 is a retainer plate 31 through which an adjusting screw 32 is threaded to exert downward pressure upon a disc 33 mounted for axial movement in the bore 24 and having an O-ring seal **33*a* around its periphery. Between the undersize of the disc 33 and the upper face of the pilot valve 30 a helical spring 34 is provided so that by tightening or loosening the screw 32 greater or lesser pressure is exerted upon the valve 30 tending to prevent upward flow of liquid through the passage 26. Formed in the block 18 and extending upwardly from its underside to intersect the passage 22 and the opening 23 is a passage 35 which is parallel with the axis of the bore 24**.

Formed through the central block 18 in axial alignment with the aperture 25 and smaller than the latter is a passage 36, and extending downward from the underside of the latter through the lower block 20 is another passage 37 to the underside of which the connection 17 is secured. Mounted for axial movement in the bushing 27 is a relief valve 38 in the form of a piston having a cavity 39 formed in its upper side to receive the lower extremity of a helical spring 40 the upper end of which bears against the upper face of the aperture 25. Thus the spring tends to retain the piston 38 upon an annular seat formed on the upper face of the central block 19. Formed through the underside of the piston 38 is an opening 41 smaller than the connecting passage 26. When liquid under pressure flows upwardly through the passages 37 and 36 from the cylinder 9 some of it passes through the opening 41 into the upper portion of the aperture 25. When sufficient liquid accumulates beneath the pilot valve 30 the latter is raised and the liquid escapes into the opening 23 whence it passes back to the tank 1. *Almost* simultaneously liquid beneath the relief valve 38 raises the latter sufficiently to flow to the tank through the radial openings 28, the chamber 29 and the passage 22.

It will be noted that the openings or ports 28 are relatively high above the seat of the relief valve 38 so that the latter must be correspondingly raised before the ports are opened; and while the relief valve is being opened ample time elapses for the pilot valve 30 to assume a normal open, operating position. Thus the two valves 30 and 38 adjust their relative positions to provide a cushioning effect and adapt themselves to absorb the shock which might otherwise result due to the rapid [reversal of] flow of liquid as herein contemplated for the repeated opening and closing of the dies. It may also be remarked that one characteristic of a good hydraulic liquid, or oil, is that air will not mix with it at all readily. However, the V-shaped notches 28a, FIGURE 10, formed in the undersides of the openings or ports 28 [insure a temporary] *minimize* foaming action [as] *of the* air [becomes momentarily] entrained with the liquid [and is therefore] *as it is* carried through the openings 28 with the liquid for discharge to the tank. In this manner I find that air is quickly and easily withdrawn from the system.

Again, while the valves 30 and 38 are relatively so arranged that they cooperate as above stated to prevent the system being subjected to such shocks that they would interfere with its smooth functioning, there is no mechanical connection between these valves.

Figure 4:
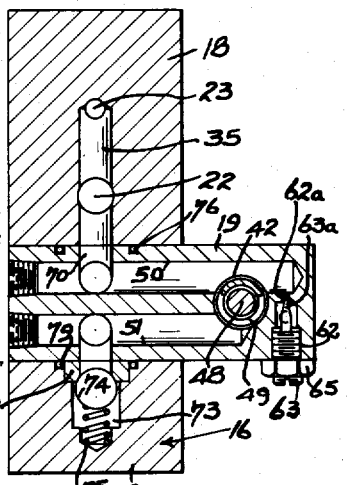
FIGURE 4 is a section on the line 4—4 of FIGURE 3.

Formed horizontally in the central block 19 from one extremity is a shut-off valve which in the present instance includes a cylinder 42 in which a spool valve 43 is axially slidable. A nut 44 is threaded into the open end of the cylinder and provided also in the latter is an axially movable disc 45 having an O-ring 46 mounted in an annular recess formed around it. Threaded through the nut 44 is a screw 47 which is adapted to force the disc 45 inwardly. Mounted around the stem 48 which projects outwardly from the spool valve 43 is a helical spring 49 the opposite end of which bears against the inner face of the disc 45. Thus the spring tends to retain the spool valve in its inward position shown in FIGURES 5 and 9. It will also be seen that the shut-off valve may be readily rendered inoperative, so that outward movement of the plunger 10 occurs immediately as the dies 5 and 6 commence to open, by tightening the screw 47 so that the disc 45 bears against the stem 48 when the valve is in its position shown in FIGURE 5. Formed horizontally in the central block 19 and extending at right angles to the cylinder 42 are two spaced parallel passages 50 and 51 which are connected to one another by the said cylinder as shown in FIGURE 4. The valve 43 intermediately of its length is provided with an annular recess 52.

Figure 7:
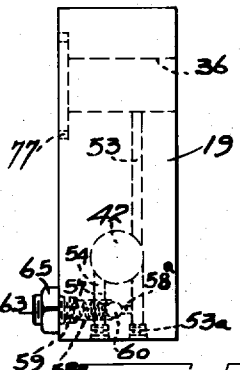
FIGURE 7 is a view taken on the line 7—7 of FIGURE 5, [and]
Figure 8:
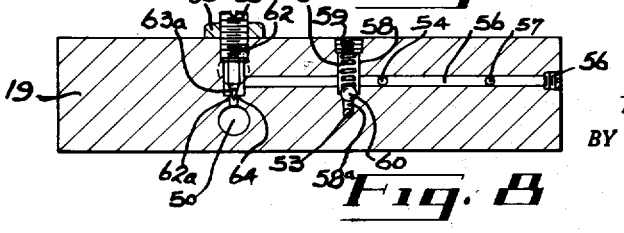
FIGURE 8 is a section on the line 8—8 of FIGURE 6[.]

Extending into the central block 19 from one side thereof and disposed at right angles to the cylinder 42 are spaced parallel passages 53 and 54 which are plugged at their outer extremities 53a and 54a respectively. The passage 53 passes intermediately of its length through the cylinder 42 and terminates at its inner end in the vertical passage 36. Formed in the block 19 parallel with the cylinder 42 is an opening 56, plugged at its outer extremity 56a. At its inner extremity this opening terminates in an aperture 62. The passage 54 intermediately of its length passes through the opening 56 and its inner extremity opens into the cylinder 42. The inner extremity of the cylinder is also connected to the opening 56 by a passage 57 which extends through one side of the central block 19 and is plugged at its outer extremity 57a. Extending through the block 19 at right angles to and intersecting the opening 56 intermediately of the length of the latter is an aperture 58 which is threaded from its outer extremity to receive a screw 59. The aperture 58 inwardly beyond the opening 56 terminates in an extension 58a of reduced diameter which opens into the passage[s] 53—FIGURES 7 and 8. A ball check valve 60 is normally retained upon a seat formed in the block 19 around the inner extremity of the aperture 58 by a spring 61 the opposite end of which bears against the screw 59. When the valve 43 is in the position shown in FIGURES 5 and 9 hydraulic liquid is adapted to flow through the passage 53 from the vertical passage 36 into the annular recess 52, and from the latter mainly through the passage 54 into the opening 56 whence it travels through the passage 57 into the cylinder 42 and forces the spool valve 43 to its position shown in FIGURE 6. However before the spool valve reaches that position the recess 52 is cut off from the passage 54 and consequently the liquid then has to flow from the recess through the passage 53 to the junction of the latter with the [the] extension aperture 58a. Then the liquid opens the check valve 60 and flows through the opening 56 and passage 57 into the inner extremity of the cylinder. The opening 62 is formed into the block from one side thereof and extends across the inner extremity of the opening 56. This opening 62 is threaded from its outer extremity to receive the stem 63 of a bleeder or metering valve 63a. Inwardly past the opening 56 the opening 62 is of reduced diameter as shown at 62a so that an annular seat 64 is formed in the block in quite close proximity to which the valve 63a is set so that an exceedingly slow flow occurs from the passage 56, past the said valve into the reduced extremity 62a of the opening 62 and into the passage 50. A lock nut 65 on the stem 63 retains the bleeder immovable in its adjusted position.

Extending downwardly in the central block 19 from its upper face and in registry with the passage 35 is an opening 70 which terminates in the passage 50; and extending downwardly from the passage 51 through the central block is another opening 70a. Formed through the lower block 20 is an aperture 71 which is plugged at its outer extremity 71a and terminates in the vertical passage 37. Secured in the upper face of the block 20 and in registry with the opening 70a is an annular seat 72 the underside of which opens into the aperture 71. Formed also in the underside of the aperture 71 in axial alignment with the annular seat 72 is a recess 73. A ball check valve 74 is normally held against the underside of the annular seat 72 by a helical spring 75 the underside of which rests in the recess 73.

RÉSUMÉ

From the foregoing it will be readily seen that, as the dies 7 and 8 open, liquid from the tank 1 under relatively low pressure flows into the cylinder 9, to move the pad 11 to its outwardly projecting position, through a conduit including the connection 15, the passages 22, [35,] 70 and 50, through the cylinder 42, the passage 51, the check valve 74 and the connection 17.

As the dies 7 and 8 close, most of the liquid in the cylinder 9 is forced under relatively high pressure through a by-pass including the passages 37 and 36, and through either the pilot valve 30 and the connections extending therefrom back to the tank, or through the relief valve 38 and the passages therefrom to the tank, with the larger flow occurring through the relief valve.

Figure 5:
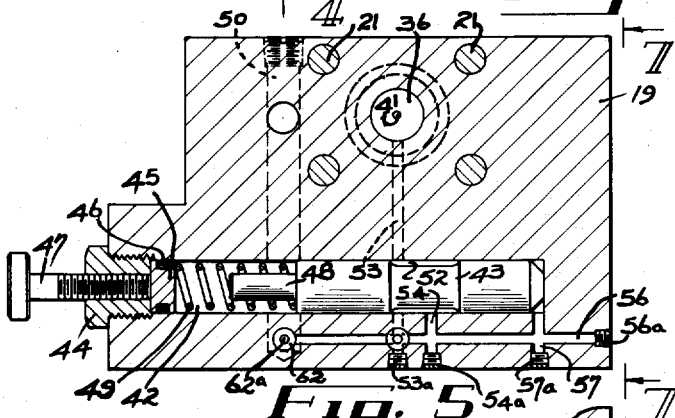
FIGURE 5 is a section on the line 5—5 of FIGURE 3.
Figure 6:
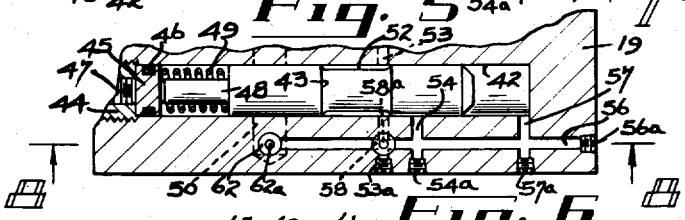
FIGURE 6 is a partial section similar to that shown in FIGURE 5 but with the spool valve in a different position.

At that time some of the liquid from the passages 37 and 36 passes through the passage 53 and into the inner extremity of the cylinder 42 as above explained so that the valve 43 is moved to its position shown in FIGURE 6 to obstruct a flow of liquid from the passage 50 into the passage 51, and therefore from the tank 1 to the cylinder 9 to move the plunger 10 therein to its outward position. Liquid is then gradually bled from the cylinder 42 as above explained and the spool valve is gradually moved back to its position shown in FIGURES 5 *and* 9 by the spring 49 so that the passages 50 and 51 are again connected to one another.

The setting of the bleeder valve 63a may be such that the escape of liquid therethrough into the passage 50 is quite slow so that an appreciable time interval occurs before enough liquid has passed for the recess 52 in the spool valve to be again in registry with the passage 54; after that, continued movement of the spool valve back to its position shown in FIGURE 5 is, of course, rapid. However since the adjustment of the bleeder valve is a delicate one it is usual to leave it at one setting and to regulate the time interval required for the pad to reassume its outward position by adjusting the position of the disc 45 by rotation of the screw 47. In this manner the length of travel of the spool valve is adjusted to accomplish the desired purpose, for of course the disc 45 constitutes a stop for the stem 48 when the valve is moved to the left, FIGURE 5, and therefore controls the distance which the valve must travel back to the right before its recess 52 again registers with the passage 54. Or again as previously stated the screw 47 may be moved inwardly to prevent all movement of the spool valve and thereby eliminate the pad delay feature, for of course there are many conditions under which such action is not required.

It will also be noted that with the construction herein described the flow of liquid in both directions between the tank and the cylinder 9 passes through the control valve and in so doing it also operates the pad delay feature; and for the latter only the shut-off valve and its connections have been added, so that there has been no substantial enlargement either of the system or of the volume of liquid required for its operation, and consequently accuracy of operation is maintained, and "bounce-back" does not occur.

*Certain features of the invention herein disclosed are disclosed in my prior application for Letters Patent Serial No. 455,270, filed September 10, 1954, now Patent No. 2,890,669, issued June 16, 1959, for "Mechanisms for Hydraulically Controlling Movement of Pads in Dies."*

While in the foregoing the preferred embodiment of the invention has been described and shown it is understood that alterations and modifications may be made thereto provided they fall within the scope of the appended claims.

What I claim is:

1. A circulating system for hydraulic liquid comprising a supply tank having liquid therein under relatively low pressure, a cylinder having a plunger therein, a conduit connecting the tank with the cylinder, a check valve in the conduit through which liquid flows to the cylinder to move the plunger therein in one direction, a shut-off valve in the conduit, a by-pass connected at its extremities to the conduit and extending around both the valves therein *for returning liquid to the tank*, a relief valve in the by-pass through which liquid expelled under relatively high pressure from the cylinder by movement of the plunger in the opposite direction flows to the tank, means connecting the cylinder with the shut-off valve through which liquid under pressure from said cylinder flows to close said shut-off valve, means tending to open the shut-off valve, and means connected to said shut-off valve for delaying the release of liquid under pressure therefrom.

2. The combination in claim 1, wherein the last named means includes means for adjusting the time interval during which liquid under pressure is released from the shut-off valve.

3. The combination in claim 1, wherein the last named means includes means for adjusting the length of travel of the shut-off valve during the release of the liquid under pressure therefrom.

4. The combination in claim 1, wherein *the last-named* means [including] *comprise* a bleeder valve [are] connected to the shut-off valve through which liquid under pressure is gradually exhausted from said shut-off valve, *said* [and means connecting the] bleeder valve *being connected* with the conduit whereby the liquid exhausted through the bleeder valve passes into said conduit.

5. The combination in claim 1, wherein the relief valve is mounted for [vertical] movement in the by-pass to expose radial openings therein connected to the tank, said radial openings having [downwardly projecting] substantially V-shaped notches formed [in their undersides wherefrom air momentarily entrained in the liquid is discharged into the tank] *therein on the side of the openings closest to the closed position of said relief valve.*

6. The combination in claim 1, wherein the relief valve is mounted for [upward] movement in the by-pass to expose radial openings therein, a pilot valve *is* mounted for [upward] movement in the by-pass to open a passage therethrough, said relief valve being positioned between the pilot valve and the cylinder and having a small opening therethrough through which liquid under pressure from the cylinder reaches the pilot valve, said pilot and relief valves being relatively so positioned that upon opening of the pilot valve by the liquid under pressure from the cylinder the relief valve opens and said valves together cushion the shock caused by commencement of flow of the liquid from the cylinder.

7. A circulating system for hydraulic liquid comprising a supply tank having liquid therein under relatively low pressure, a cylinder having a plunger therein, a conduit connecting the tank with the cylinder, a check valve in the conduit through which liquid flows to the cylinder to move the plunger in one direction, a by-pass connected to the opposite extremities of the conduit and extending around the check valve, a relief valve mounted for [vertical] movement in the by-pass to expose radial openings therethrough when said relief valve is [lifted] *moved* by liquid expelled under pressure from the cylinder upon movement of the plunger in the opposite direction, means extending from the radial openings [to] *in* the by-pass [adjacent] *to* the tank for the passage of liquid therethrough to said tank, said radial openings having [downwardly projecting and] *outwardly inclined* substantially V-shaped notches formed therein [the undersides of which are upwardly and outwardly inclined for the passage therethrough of air momentarily entrained with the liquid whereby said air passes into the tank] *on the side of the openings closest to the closed position of said relief valve.*

8. A circulating system for hydraulic liquid comprising a supply tank having liquid therein under relatively low pressure, a cylinder having a plunger therein, a conduit connecting the tank with the cylinder, a check valve in the conduit through which liquid flows from the tank to the cylinder to move the plunger in one direction, a by-pass connected to the opposite extremities of the conduit and extending around the check valve, a pilot valve mounted for movement in the by-pass and operable to open a passage therethrough, a relief valve mounted in the by-pass for movement therein to expose radial openings through said by-pass, said relief valve being positioned between the cylinder and the pilot valve and having a small opening therethrough through which liquid under pressure is connected to reach the pilot valve and move it to open position upon movement of the plunger in the opposite direction, connecting means extending from the radial openings to the by-pass adjacent its extremity [connected] to the tank through which liquid flows to said tank, said pilot and relief valves being relatively so positioned that upon opening of the pilot valve the relief valve then opens to expose the radial openings whereupon a flow of liquid under pressure passes through both said valves to cushion the shock caused by commencement of the flow of liquid from the cylinder, and a spring tending to retain each of the last named valves in closed position.

9. A circulating system for hydraulic liquid comprising a supply tank having liquid therein under relatively low pressure, a cylinder having a plunger therein, a conduit connecting the tank with the cylinder, a check valve in the conduit through which liquid flows to the cylinder to move the plunger therein in one direction, a shut-off valve in the conduit, a by-pass connected at its extremities to the conduit and extending around both the valves therein, a relief valve in the by-pass through which liquid expelled under relatively high pressure from the cylinder by movement of the plunger in the opposite direction flows to the tank, means connecting the cylinder with the shut-off valve through which liquid under pressure from the cylinder flows to close said shut-off valve, and means tending to open the shut-off valve.

10. A circulating system for hydraulic liquid comprising a storage tank having liquid under relatively low pressure therein, a cylinder having a plunger therein, a control valve having *a valve cylinder* [an aperture] therein and separate conduit portions connected to one another by said [aperture] *valve cylinder,* means connecting one conduit portion with the tank, means connecting one conduit portion with the cylinder, a check valve in one of the conduit portions through which liquid flows from the tank to the cylinder to move the plunger in one direction, a valve in the [aperture] *valve cylinder* for closing the connection between the conduit portions, said control valve having a by-pass therein extending around the check valve and said [aperture] *valve cylinder* and terminating at each extremity in one of the conduit portions, a relief valve in the by-pass opened by liquid expelled under relatively high pressure from the cylinder upon movement of the plunger in the opposite direction, said control valve having a passage therein connecting the by-pass between the cylinder and the relief valve with said [aperture] *valve cylinder* through which liquid under pressure from the cylinder flows to move the valve in said [aperture] *valve cylinder* to close the connection between the conduit portions, means tending to move said valve to its open position, and means connected to the control valve for delaying the exhaust of liquid under pressure from said [aperture] *valve cylinder.*

11. A circulating system for hydraulic liquid comprising a supply tank having liquid therein under relatively low pressure, a cylinder having a plunger therein, a conduit connecting the tank with the cylinder through which liquid flows to the cylinder to move the plunger therein in one direction, a check valve in the conduit to prevent return flow of liquid therethrough, a normally open shut-off valve in said conduit, a by-pass connected at its extremities to the conduit and extending around both of the valves therein, a normally closed relief valve in the by-pass through which liquid expelled under relatively high pressure from the cylinder by movement of the plunger in the opposite direction flows to the tank, and means connecting the cylinder with the shut-off valve through which liquid under pressure from the cylinder flows to close said shut-off valve.

12. A system according to claim 11 including a restricted flow passage between said connecting means and said conduit on the tank side of said check valve.

*13. A circulating system for hydraulic liquid comprising a supply tank having liquid therein under relatively low pressure, a cylinder having a plunger therein, a conduit connecting the tank with the cylinder, a check valve in the conduit through which liquid flows from the tank to the cylinder to move the plunger in one direction, a by-pass connected to the conduit and extending around the check valve to permit liquid to flow from the cylinder to the tank upon movement of the plunger in the opposite direction, a pilot valve in the by-pass and operable to open a passage therethrough, a normally closed piston type relief valve in the by-pass mounted for movement toward open position to expose a plurality of spaced openings through said by-pass, said openings being positioned so that said relief valve must move a substantial distance from its normally closed position before said openings are exposed, said relief valve being positioned between the cylinder and the pilot valve and having a small opening therethrough through which liquid under pressure is connected to reach the pilot valve and move it to open position upon movement of the plunger in said opposite direction, said plurality of spaced openings exposed upon opening movement of the relief valve being connected to the tank so that liquid which flows therethrough when said relief valve is open flows to said tank, said pilot and relief valves being relatively so positioned that upon opening of the pilot valve the relief valve then opens to expose said plurality of spaced openings whereupon a flow of liquid under pressure passes through said passage and openings controlled by both said valves to cushion the shock caused by commencement of the flow of liquid from the cylinder, and a spring tending to retain each of the last named valves in closed position.*

*14. A circulating system according to claim 13 wherein at least one of said plurality of spaced openings exposed upon opening movement of the relief valve has an inclined notch formed therein on the side of such opening closest to the closed position of said relief valve.*

*15. A circulating system for hydraulic liquid comprising a supply tank having liquid therein under relatively low pressure, a cylinder having a plunger therein, a conduit connecting the tank with the cylinder, a check valve in the conduit arranged to permit liquid to flow in one direction from the tank to the cylinder to move the plunger in one direction in response to the pressure on the liquid in the supply tank, a pressure relief by-pass connected to said conduit and tank and extending around the check valve to permit liquid to flow from the cylinder to the tank upon movement of the plunger in the opposite direction, said pressure relief by-pass including a normally closed pilot valve operable upon opening to open a passage through the by-pass around said closed valve, and a normally closed piston type relief valve operable upon opening to open another passage through the by-pass around said check valve and said pilot valve, said last-mentioned passage including a plurality of spaced openings exposed upon opening movement of said relief valve and an annular chamber surrounding said relief valve, said openings being positioned so that said relief valve must move a substantial distance from its normally closed position before said openings are exposed, said relief valve being positioned between the cylinder and the pilot valve and having a restricted opening therethrough through which liquid under pressure is supplied to the pilot valve to move it to open position upon movement of the plunger in the opposite direction, said by-pass extending to the tank for returning liquid to said tank, said pilot and relief valves being relatively so positioned that upon opening of the pilot valve the relief valve then opens to expose said spaced openings and annular chamber whereupon a flow of liquid under pressure passes through said passages controlled by both said valves to cushion the shock caused by commencement of the flow of liquid from the cylinder,*

*and a spring tending to retain each of the last-named valves in closed position.*

*16. A system according to claim 8 including a valve in said conduit movable to open and closed positions, and means operable for moving said valve to one of its positions so as to retard the return flow of liquid from said tank to said cylinder so as to delay return movement of said plunger in said one direction.*

References Cited in the file of this patent or the original patent

UNITED STATES PATENTS

| | | |
|---|---|---|
| 1,757,737 | Rode | May 6, 1930 |
| 1,787,996 | Rode | Jan. 6, 1931 |
| 2,573,993 | Sedgwick | Nov. 6, 1951 |
| 2,677,238 | Greer | May 4, 1954 |
| 2,737,966 | Lucien | Mar. 13, 1956 |
| 2,763,128 | Hott | Sept. 18, 1956 |